Patented Aug. 4, 1953 2,647,911

UNITED STATES PATENT OFFICE 2,647,911

PRODUCTION OF METHYLHYDROGEN-POLYSILOXANE

Siegfried Nitzsche and Ewald Pirson, Burghausen, Oberbayern, Germany, assignors, by mesne assignments, to Wacker-Chemie G. m. b. H., Munich, Germany No Drawing. Application June 21, 1951, Serial No. 232,873. In Germany June 24, 1950

5 Claims. (Cl. 260—448.2)

The present invention relates to the production of methylhydrogenpolysiloxane fluids.

The preparation of organosilicon fluids by the hydrolysis and condensation of organosilanes, such as those having two methyl or other organic radicals bonded to the silicon atoms, has heretofore been described. The hydrolysis is conducted by reacting a chlorosilane, such as dimethyldichlorosilane, with water, generally in the presence of an inert solvent. The organosilicon fluids are thus obtained without difficulty.

By hydrolysis of methyldichlorosilane equivalent fluids should be producible, inasmuch as the silicon-bonded hydrogen is not readily hydrolyzed by water. Instead, when methyldichlorosilane is hydrolyzed with water, hard, brittle products are produced instead of the expected fluids. Obviously, under these conditions the hydrogen has been cleaved from the silicon. Various methods have been proposed for avoiding this result. Thus, the use of an inert solvent has been suggested. Likewise, it has been proposed that the cleavage of the hydrogen may be avoided by maintaining low temperature during hydrolysis. A third method which has been proposed to avoid the production of the resinous products is the cohydrolysis of trimethylchlorosilane with the methyldichlorosilane. The first two proposals above mentioned are not entirely sufficient. The third method effects solubilizing of the product only by virtue of end-blocking, and not by reduction in hydrogen loss from the siloxane. Accordingly, these methods have not led to entirely satisfactory results. At best, only a small amount of oil is obtained, the remainder being useless.

An object of the present invention is to provide improved methods for the hydrolysis of methyldichlorosilane whereby to obtain improved hydrolysis products in improved yield.

In accordance with the process of the present invention, methyldichlorosilane is reacted with an alcohol to effect interchange of alkoxy radicals for chlorine atoms, the alcohol being employed in amount less than two mols of alcohol per mol of methyldichlorosilane. The reaction product, which then contains both chlorine atoms and alkoxyl radicals bonded to the silicon, is hydrolyzed by reacting it with water in amount sufficient to hydrolyze both the chlorine atoms and the alkoxy radicals in the presence of an inert solvent. Operation in this manner results in the preferential formation of oils.

The alcohol is preferably a lower aliphatic alcohol having from one to four carbon atoms per molecule and is preferably a primary alcohol, such as ethanol. The alcohol is employed in amount less than sufficient to replace all of the chlorine atoms and is preferably employed in the range of between 0.1 and 0.5 mol of alcohol per mol of methyldichlorosilane.

It is preferred that the water employed to react with the reaction product of methyldichlorosilane and alcohol be maintained at a low temperature. Thus, it is preferred to employ either ice or ice water, though this is not essential to obtaining substantially improved amounts by the methods of this invention.

While the silane preferably employed in accordance with the present invention is methyldichlorosilane, one may also employ a mixture of hydrolyzable silanes which contain methyldichlorosilane. Thus, the silanes with which the methyldichlorosilane may be in mixture are of the general formula $R_nSiX_{4-n}$, in which R represents monovalent hydrocarbon radicals free of aliphatic unsaturation, X represents halogen and alkoxyl, and $n$ has an average value of from 1 to 3, inclusive.

The following examples illustrate procedures in accordance herewith.

Example 1

One liter of methyldichlorosilane was dissolved in one-half liter of methylene chloride. The solution was reacted with 180 cc. of ethanol, during which reaction hydrogen chloride was evolved. The solution so produced was poured onto ice. Two layers were formed, one an aqueous layer and the other a nonaqueous layer. The two layers were separated, and the nonaqueous layer was washed several times with water. The methylene chloride was then distilled from the nonaqueous layer, which resulted in a light viscous oil in amount of about 85 to 90 per cent of theoretical.

Example 2

When a mixture consisting of methyldichlorosilane and dimethyldichlorosilane is processed in accordance with Example 1, a high yield of an oil is obtained which has groupings therein of the type

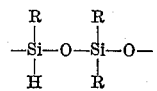

Example 3

A mixture of 91 grams of dimethyldichlorosilane and 41 grams of methyldichlorosilane was prepared and mixed with 5 cc. of ethanol, whereby replacement of a portion of the chlorine atoms was obtained. The reaction product was poured into ice water and allowed to stand for thirty minutes. The nonaqueous layer was separated and washed twice with water. There was thereby obtained over 53 grams of oil.

Products prepared in accordance with the present invention are of utility for the treatment of fabrics to render the same water repellent.

That which is claimed is:

1. The method for the preparation of organosiloxanes carrying silicon-bonded hydrogen comprising alkoxylating methyldichlorosilane with a monohydric aliphatic alcohol in amount insufficient to displace all of the chlorine atoms and hydrolyzing the reaction product by reacting it with water in amount sufficient to hydrolyze all of the chlorine atoms and alkoxyl radicals.

2. The method for the preparation of siloxanes in accordance with claim 1 in which the alcohol is employed in amount between 0.1 and 0.5 mol per mol of methyldichlorosilane.

3. The method for the preparation of organosiloxanes carrying silicon-bonded hydrogen comprising alkoxylating methyldichlorosilane with a primary aliphatic alcohol of from 1 to 4 carbon atoms, inclusive, in amount insufficient to displace all of the chlorine atoms, and hydrolyzing the reaction product by reacting it with water in amount sufficient to hydrolyze all of the chlorine atoms and alkoxy radicals.

4. The method in accordance with claim 3 in which the alcohol is employed in amount between 0.1 and 0.5 mol per mol of methyldichlorosilane.

5. The method in accordance with claim 3 in which the alcohol is ethanol.

SIEGFRIED NITZSCHE.
EWALD PIRSON.

References Cited in the file of this patent

UNITED STATES PATENTS

| Number | Name | Date |
|---|---|---|
| 2,386,793 | Hanford | Oct. 16, 1945 |
| 2,521,673 | Britton | Sept. 12, 1950 |
| 2,542,641 | Doyle | Feb. 20, 1951 |